(12) United States Patent
Kim et al.

(10) Patent No.: US 12,204,118 B2
(45) Date of Patent: Jan. 21, 2025

(54) STEREOPSIS IMAGE DISPLAY DEVICE WITH OFFSET PIXEL GROUPS AND UNIFORM VERTICAL SEPARATION

(71) Applicant: LG Display Co., Ltd., Seoul (KR)

(72) Inventors: DongYeon Kim, Paju-si (KR); HeeCheol Kim, Paju-si (KR); Juhoon Jang, Paju-si (KR); Hoon Kang, Paju-si (KR); Gyusuk Jung, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/455,095

(22) Filed: Aug. 24, 2023

(65) Prior Publication Data

US 2024/0168308 A1 May 23, 2024

(30) Foreign Application Priority Data

Nov. 18, 2022 (KR) .................. 10-2022-0155173

(51) Int. Cl.
| | |
|---|---|
| *G02B 30/27* | (2020.01) |
| *G02F 1/03* | (2006.01) |
| *G02F 1/1335* | (2006.01) |
| *G02F 1/1339* | (2006.01) |
| *G02F 1/1343* | (2006.01) |
| *G02F 1/35* | (2006.01) |

(52) U.S. Cl.
CPC ............ *G02B 30/27* (2020.01); *G02F 1/0311* (2013.01); *G02F 1/133526* (2013.01); *G02F 1/133607* (2021.01); *G02F 1/13394* (2013.01); *G02F 1/134345* (2021.01); *G02F 1/3503* (2021.01)

(58) Field of Classification Search
CPC ............ G02F 1/133526; G02F 1/3503; G02F 1/134345
See application file for complete search history.

(56) References Cited

U.S. PATENT DOCUMENTS

2010/0182408 A1* 7/2010 Liu ............... H04N 13/324
348/E13.001

FOREIGN PATENT DOCUMENTS

| EP | 3-067733 | * | 9/2016 | ............ G02B 27/22 |
| KR | 10-2015-0080243 A | | 7/2015 | |
| WO | WO-2014-050819 | * | 3/2014 | ............... G02F 1/13 |

* cited by examiner

*Primary Examiner* — Lauren Nguyen
(74) *Attorney, Agent, or Firm* — POLSINELLI PC

(57) ABSTRACT

Disclosed is a stereopsis image display device comprising a display panel including a plurality of pixels and a black matrix having a plurality of openings respectively overlapped with the plurality of pixels, and a plurality of lenses disposed over the display panel and extending in a vertical direction, wherein the plurality of pixels includes K pixel groups composed of M pixels disposed in each of N horizontal lines, the N horizontal lines include a first horizontal line and a second horizontal line adjacent to the first horizontal line in the vertical direction, wherein K, M, and N are integers greater than or equal to 2, and the pixels arranged in the second horizontal line are shifted by a first distance in a horizontal direction with respect to the pixels arranged in the first horizontal line.

17 Claims, 15 Drawing Sheets

A  B

Color Break

STEREOPSIS IMAGE DISPLAY DEVICE WITH OFFSET PIXEL GROUPS AND UNIFORM VERTICAL SEPARATION

CROSS-REFERENCE TO RELATED APPLICATION

This application claims the priority of Korean Patent Application No. 10-2022-0155173 filed on Nov. 18, 2022, which is hereby incorporated by reference in its entirety.

BACKGROUND

Technical Field

The present disclosure relates to a display device, and more particularly, to a stereopsis image display device.

Description of the Related art

Recently, a stereopsis image display device capable of displaying a three-dimensional 3D image as well as two-dimensional 2D image is being developed according to the increase of a user demand for a realistic image.

A stereopsis image display device according to the related art separately displays a left-eye image and a right-eye image through a display panel and separates a stereopsis image into a multiple views through a lenticular lens disposed on the display panel. Each pixel formed on the display panel displays an image corresponding to a view map allocated according to the multiple views.

The lenticular lens is provided in such a way that its longitudinal direction is angled at a predetermined angle on the display panel. In this case, the lenticular lens may cause a problem related with a distortion of a vertical image. In addition, the lenticular lens may enlarge a luminance deviation that is generated inside the pixel so that the luminance deviation is visible to a viewer.

SUMMARY

The present disclosure has been made in view of the above problems, and it is an object of the present disclosure to provide a stereopsis image display device capable of overcoming a distortion of a vertical image.

It is another object of the present disclosure to provide a stereopsis image display device capable of overcoming a luminance deviation generated inside a pixel.

It is a further object of the present disclosure to provide a stereopsis image display device capable of overcoming a luminance deviation occurring between adjacent views.

In accordance with an aspect of the present disclosure, the above and other objects may be accomplished by the provision of a stereopsis image display device comprising a display panel including a plurality of pixels and a black matrix having a plurality of openings respectively overlapped with the plurality of pixels, and a plurality of lenses disposed on the display panel and formed in a vertical direction, wherein the plurality of pixels includes 'K' pixel groups (wherein, 'K' is an integer equal to or greater than 2) composed of 'M' pixels (wherein, 'M' is an integer greater than or equal to 2) disposed in each of 'N' horizontal lines (wherein, 'N' is an integer greater than or equal to 2), the 'N' horizontal lines include a first horizontal line and a second horizontal line adjacent to the first horizontal line in the vertical direction, and the pixels arranged in the second horizontal line are shifted by a first distance in a horizontal direction with respect to the pixels arranged in the first horizontal line.

In addition to the effects of the present disclosure as mentioned above, additional advantages and features of the present disclosure will be clearly understood by those skilled in the art from the above description of the present disclosure.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
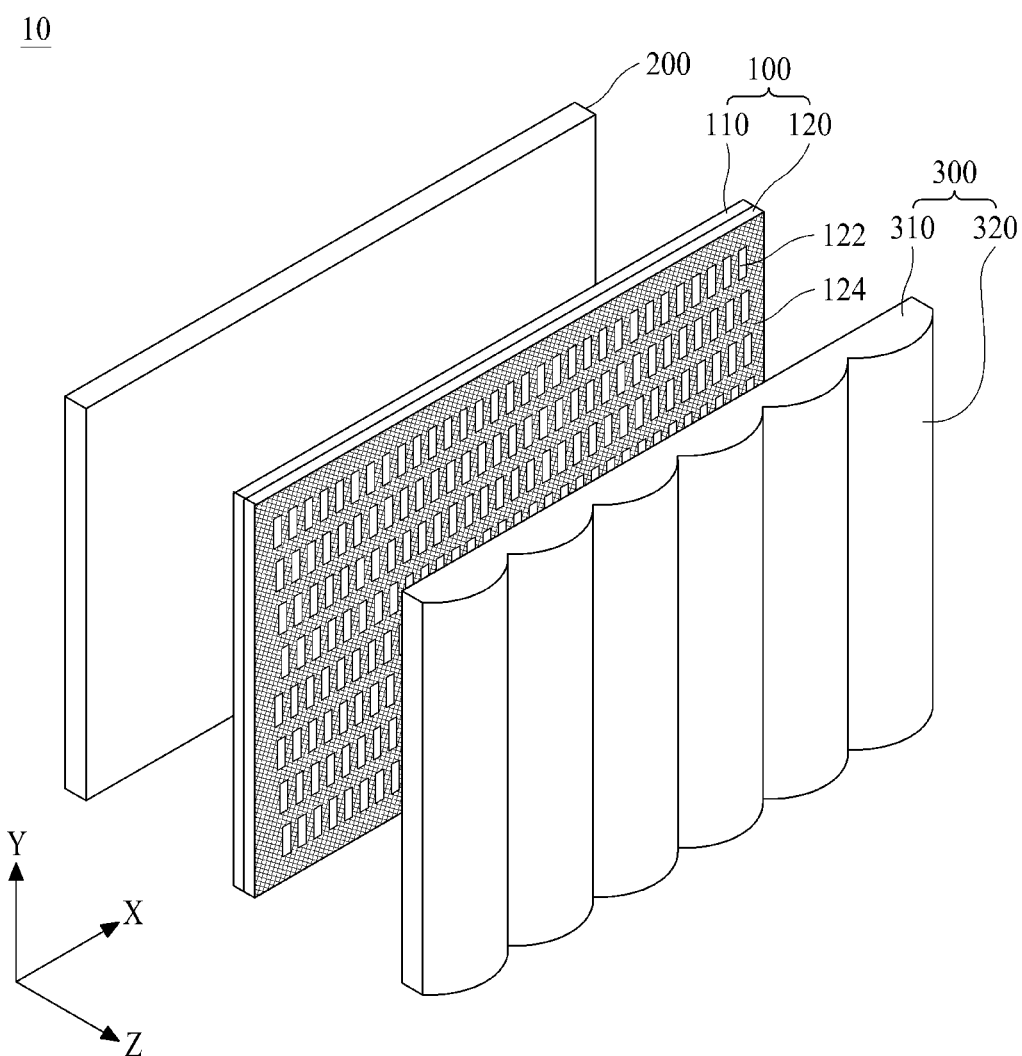
FIG. 1 schematically illustrates a stereopsis image display device according to one aspect of the present disclosure.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

A shape, a size, dimensions (e.g., length, width, height, thickness, radius, diameter, area, etc.), a ratio, an angle, and a number of elements disclosed in the drawings for describing embodiments of the present disclosure are merely an example, and thus, the present disclosure is not limited to the illustrated details.

A dimension including size and a thickness of each component illustrated in the drawing are illustrated for convenience of description, and the present disclosure is not limited to the size and the thickness of the component illustrated, but it is to be noted that the relative dimensions including the relative size, location, and thickness of the components illustrated in various drawings submitted herewith are part of the present disclosure.

Like reference numerals refer to like elements throughout the specification. In the following description, when the detailed description of the relevant known function or configuration is determined to unnecessarily obscure the important point of the present disclosure, the detailed description will be omitted. In a case where 'comprise,' 'have,' and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when the position relationship is described as 'upon~,' 'above~,' 'below~,' and 'next to~,' one or more portions may be arranged between two other portions unless 'just' or 'direct' is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," etc., may be used. These terms are intended to identify the corresponding elements from the other elements, and basis, order, or number of the corresponding elements are not limited by these terms. The expression that an element is "connected" or "coupled" to another element should be understood that the element may directly be connected or coupled to another element but may directly be connected or coupled to another element unless specially mentioned, or a third element may be interposed between the corresponding elements.

Features of various aspects of the present disclosure may be partially or overall coupled to or combined with each other and may be variously inter-operated with each other and driven technically as those skilled in the art may sufficiently understand. The aspects of the present disclosure may be carried out independently from each other, or may be carried out together in co-dependent relationship.

Figure 2:
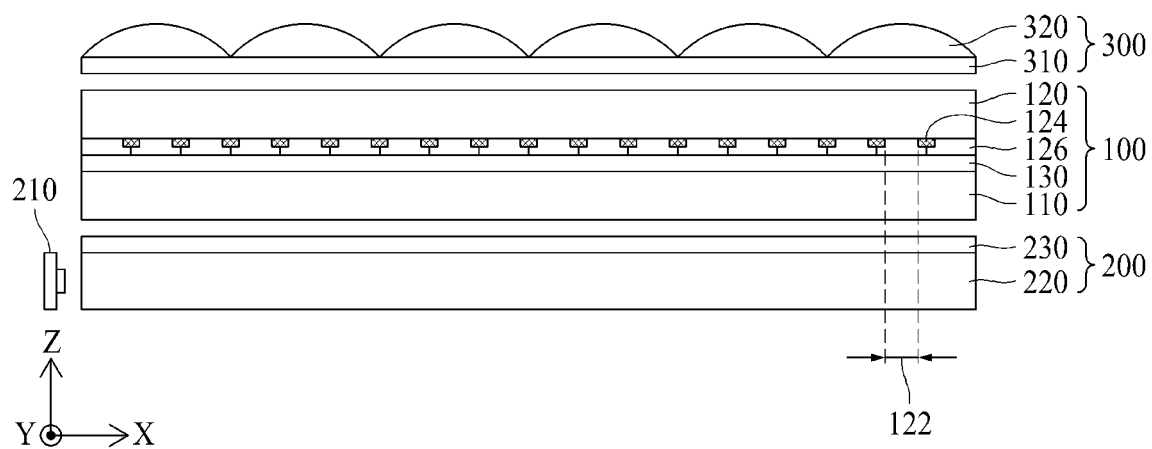
FIG. 2 is a cross sectional view schematically illustrating the stereopsis image display device according to an aspect of the present disclosure.
Figure 3:
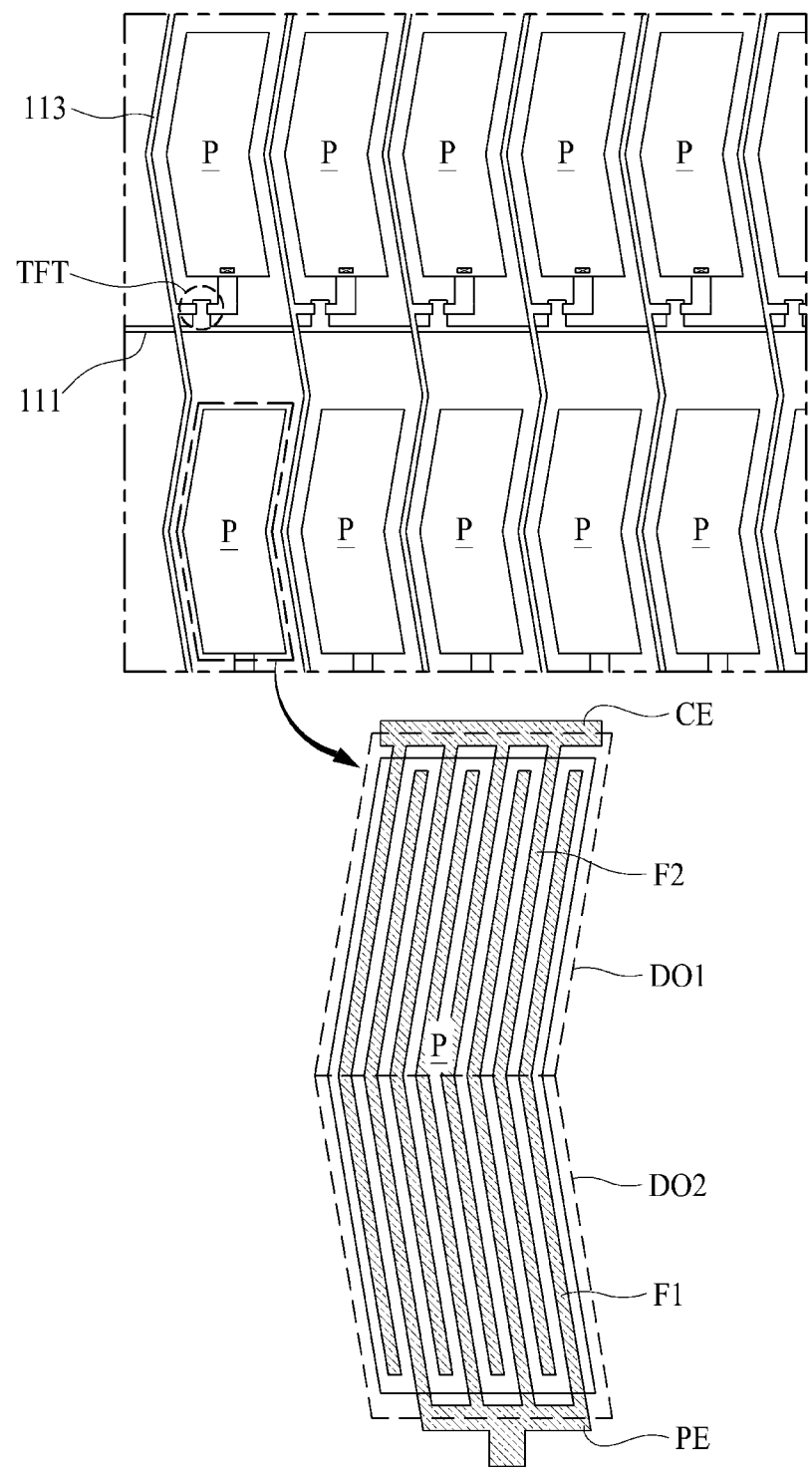
FIG. 3 schematically illustrates a configuration of a first substrate of a display panel.
Figure 4:
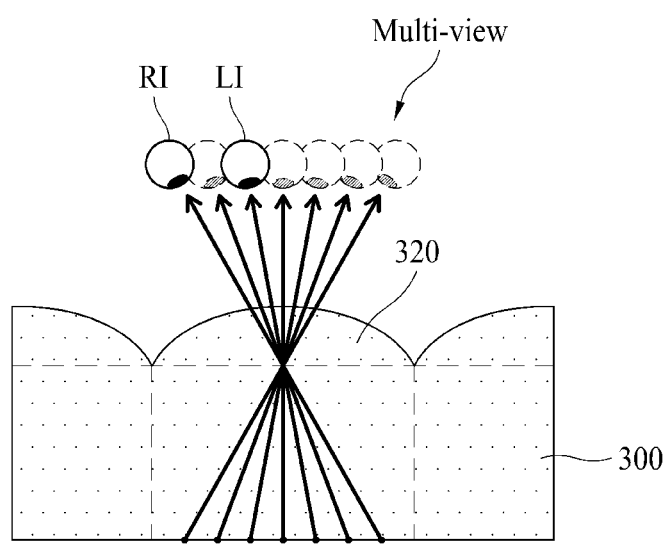
FIG. 4 illustrates a multiple view implementation in a stereopsis image display device.

FIG. 1 schematically illustrates a stereopsis image display device according to an aspect of the present disclosure. FIG. 2 is a cross sectional view schematically illustrating the stereopsis image display device according to an aspect of the present disclosure. FIG. 3 schematically illustrates a configuration of a first substrate of a display panel. FIG. 4 illustrates a multiple view implementation method in a stereopsis image display device.

The stereopsis image display device 10 according to an aspect of the present disclosure may be implemented as a flat panel display device. Non-limiting examples of a flat panel display device include a liquid crystal display (LCD) device, a field emission display (FED) device, a plasma display panel (PDP), and an organic light emitting diode (OLED) display. In the following aspect, the stereopsis image display device 10 is implemented as the liquid crystal display LCD device, but not limited thereto.

Referring to FIGS. 1 to 4, the stereopsis image display device 10 according to aspects of the present disclosure includes a display panel 100, a backlight unit 200, and a viewing angle controller 300.

The display panel 100 displays an image by using a plurality of pixels P. The display panel 100 includes a first substrate 110 and a second substrate 120 facing each other with a liquid crystal layer 130 interposed therebetween.

The first substrate 110 is a thin film transistor array substrate including a thin film transistor. As shown in FIG. 3, the first substrate 110 may include a plurality of gate lines 111, a plurality of data lines 113, a thin film transistor (TFT), and a plurality of pixels P.

The plurality of gate lines 111 and the plurality of data lines 113 are arranged to cross each other on the first substrate 110 and define a plurality of pixel areas.

The thin film transistor TFT is formed in a transistor region of the pixel area. In some examples, the thin film transistor TFT is switched according to a gate signal supplied to the gate line 111 and is configured to supply a data signal supplied to the data line 113 to a pixel electrode PE. The thin film transistor TFT includes a gate electrode, a semiconductor layer, a source electrode, and a drain electrode. The thin film transistor TFT may be formed in a bottom gate structure in which the gate electrode is positioned under the semiconductor layer or may be formed in a top gate structure in which the gate electrode is positioned above the semiconductor layer.

The plurality of pixels P may display different colors. For example, the plurality of pixels P may include a red pixel for displaying a red color, a green pixel for displaying a green color, and a blue pixel for displaying a blue color, but not limited thereto. The plurality of pixels P may further include a white pixel for displaying a white color.

Each of the plurality of pixels P includes a common electrode CE and a pixel electrode PE connected to the thin film transistor TFT.

The pixel electrode PE may be connected to a source electrode or a drain electrode of the thin film transistor TFT and may be configured to form an electric field in the liquid crystal layer 130 based on the data signal supplied from the thin film transistor TFT. The pixel electrode PE may include a plurality of first fingers F1. The plurality of first fingers F1 may protrude from the pixel electrode PE and may extend to be adjacent to the common electrode CE disposed in an upper region of the pixel P.

The common electrode CE forms the electric field together with the pixel electrode PE to drive (e.g., activate) liquid crystal molecules of the liquid crystal layer 130. The common electrode CE may include a plurality of second fingers F2. The plurality of second fingers F2 may protrude from the common electrode CE and may extend to be adjacent to the pixel electrode PE disposed in a lower region of the pixel P.

Each of the plurality of second fingers F2 may be disposed between the neighboring first fingers F1. Accordingly, a horizontal electric field may be formed between the pixel electrode PE and the common electrode CE.

FIG. 3 shows that the common electrode CE includes the plurality of second fingers F2, but not limited thereto. In another example, the common electrode CE may be formed to entirely cover the plurality of pixel areas. In this case, a horizontal electric field may be formed between the pixel electrode PE and the common electrode CE.

In a horizontal electric field driving method such as an In-Plane switching (IPS) mode and a fringe field switching (FFS) mode, the common electrode CE together with the pixel electrode PE may be formed on the first substrate 110. On the other hand, in a vertical electric field driving method such as a Twisted Nematic (TN) mode and a Vertical Alignment (VA) mode, the common electrode CE may be formed on the second substrate 120. A liquid crystal mode of the display panel 100 may be implemented in any liquid crystal mode as well as the above-mentioned TN mode, VA mode, IPS mode, and FFS mode.

According to one example, the pixel electrode PE is formed in a curved shape, the pixel P may be formed in a multi-domain structure with a first domain DO1 and a second domain DO2. The multi-domain structure may control an arrangement direction of liquid crystals in the first domain DO1 and the second domain DO2 to improve a color shift and a viewing angle. In case of the multi-domain structure, the plurality of first fingers F1 and the plurality of second fingers F2 have a curved shape at the boundary region between the first domain DO1 and the second domain DO2. Accordingly, the first finger F1 and the second finger F2 may be aligned in the first direction in the first domain DO1 and may be aligned in the second direction in the second domain DO2.

A view map configured based on the number of multiple views (or viewing areas) may be assigned in each of the plurality of pixels P as described above.

The second substrate 120 is a color filter array substrate including a color filter. As shown in FIG. 2, the second substrate 120 may include a black matrix 124 and a color filter 126.

The black matrix 124 may include a plurality of openings 122 overlapped with the plurality of pixels P, respectively. Each of the plurality of openings 122 defines an opening area of the pixel P, wherein each opening 122 may be formed in a different shape from the pixel P and may have a smaller area than the pixel P. A portion of the pixel P may be exposed by the opening 122.

The color filter 126 may be provided in the opening 122, which is not covered by the black matrix 124. The color filter 126 may include a red color filter, a green color filter, and a blue color filter.

In the display panel 100, the data signal is supplied from a panel driver to the corresponding pixel P and an electric field is formed in the liquid crystal layer 130 to control a transmittance of light emitted from the backlight unit 200. Accordingly, the display panel 100 may display an image according to the view map assigned to each pixel P.

The backlight unit 200 may be arranged on a rear surface of the display panel 100 and is configured to irradiate light to the display panel 100. The backlight unit 200 may include a light source 210, a light guide plate 220 for guiding light from the light source 210 toward the display panel 100, and an optical sheet 230 disposed over the light guide plate 220 and configured to improve light efficiency. The backlight unit 200 may be implemented in a direct type or an edge type. The light sources 210 of the backlight unit 200 may include one light source or two or more types of light sources among a hot cathode fluorescent lamp (HCFL), a cold cathode fluorescent lamp (CCFL), an external electrode fluorescent lamp (EEFL), a light emitting diode (LED), and an organic light emitting diode (OLED).

The viewing angle controller 300 is disposed over the display panel 100. The viewing angle controller 300 may include a base film 310 and a plurality of lenses 320 provided over an upper surface of the base film 310. The plurality of lenses 320 may be formed to be convex from the upper surface of the base film 310 and may extend in a vertical direction. For example, the plurality of lenses 320 may have a cross section of a semicircular shape or a convex lens having a constant curvature. The plurality of lenses 320 may be lenticular lenses, but not necessarily limited thereto. The plurality of lenses 320 may be implemented as a switchable lens.

The viewing angle controller 300 may separate the image displayed on the plurality of pixels P into multiple views (or viewing areas). More specifically, as shown in FIG. 4, the viewing angle controller 300 forms the viewing area (e.g., a viewing zone) at an optimal viewing distance by controlling light from the plurality of pixels P. The viewing area may include the multiple views. Each of the views has a diamond shape, which is also referred to as view diamond. A width of each of the plurality of views may be smaller than a binocular distance of a person to make different images appear in each eye of the person.

The viewing angle controller 300 may separate the image displayed on the plurality of pixels P into the plurality of views by using the plurality of lenses 320. The viewing angle controller 300 may divide the image displayed on the plurality of pixels P included in the lenses 320 into the plurality of views corresponding to the view map, thereby enabling a viewer to view a stereopsis image in the plurality of viewing zones. At this time, a viewer may perceive a three-dimensional effect by a binocular difference between a left-eye image LI recognized in a left eye and a right-eye image RI recognized in a right eye in a predetermined viewing region.

Figure 5:
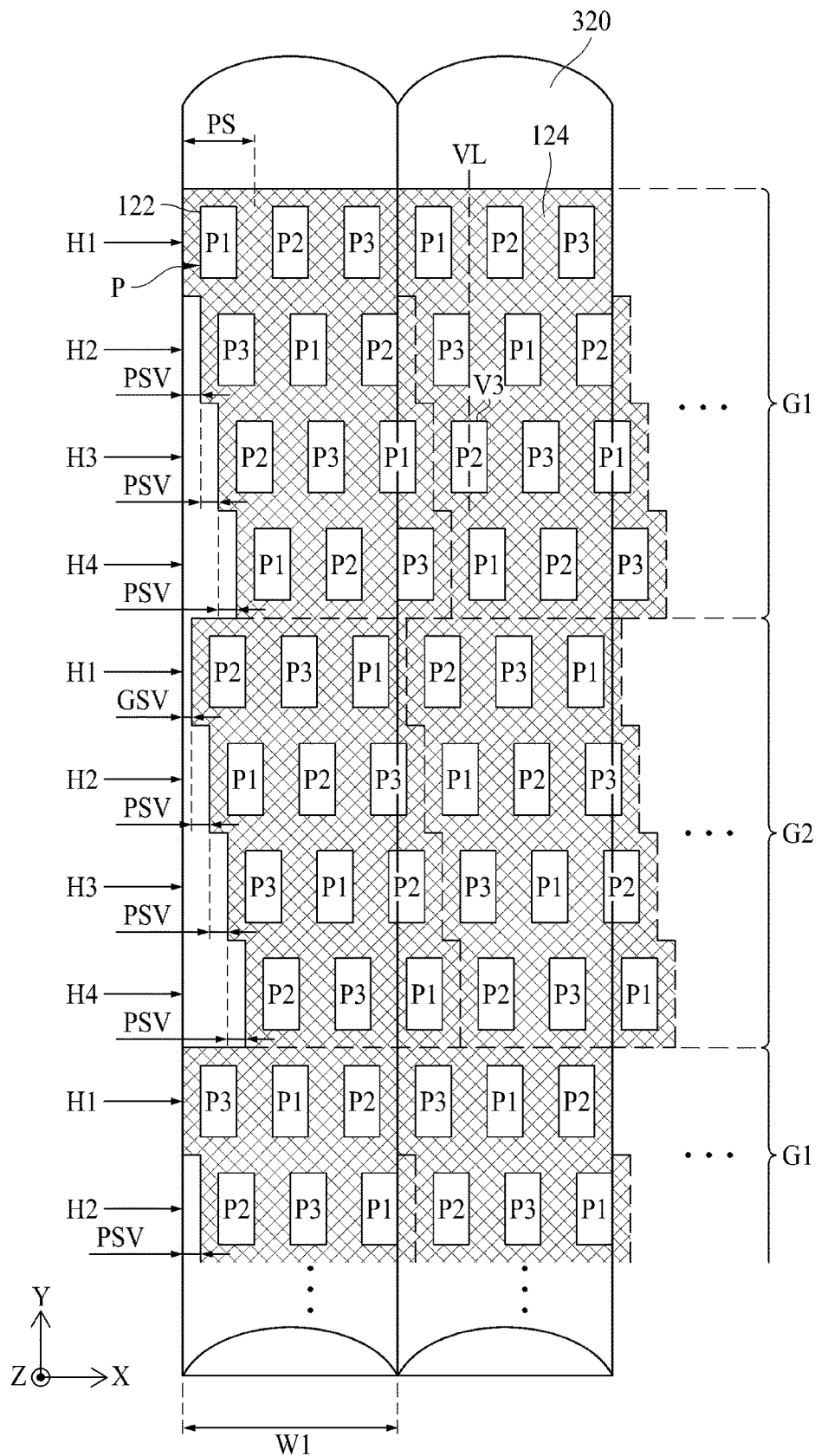
FIG. 5 illustrates an example of pixels and lenses disposed in a stereopsis image display device according to one aspect of the present disclosure.
Figure 6:
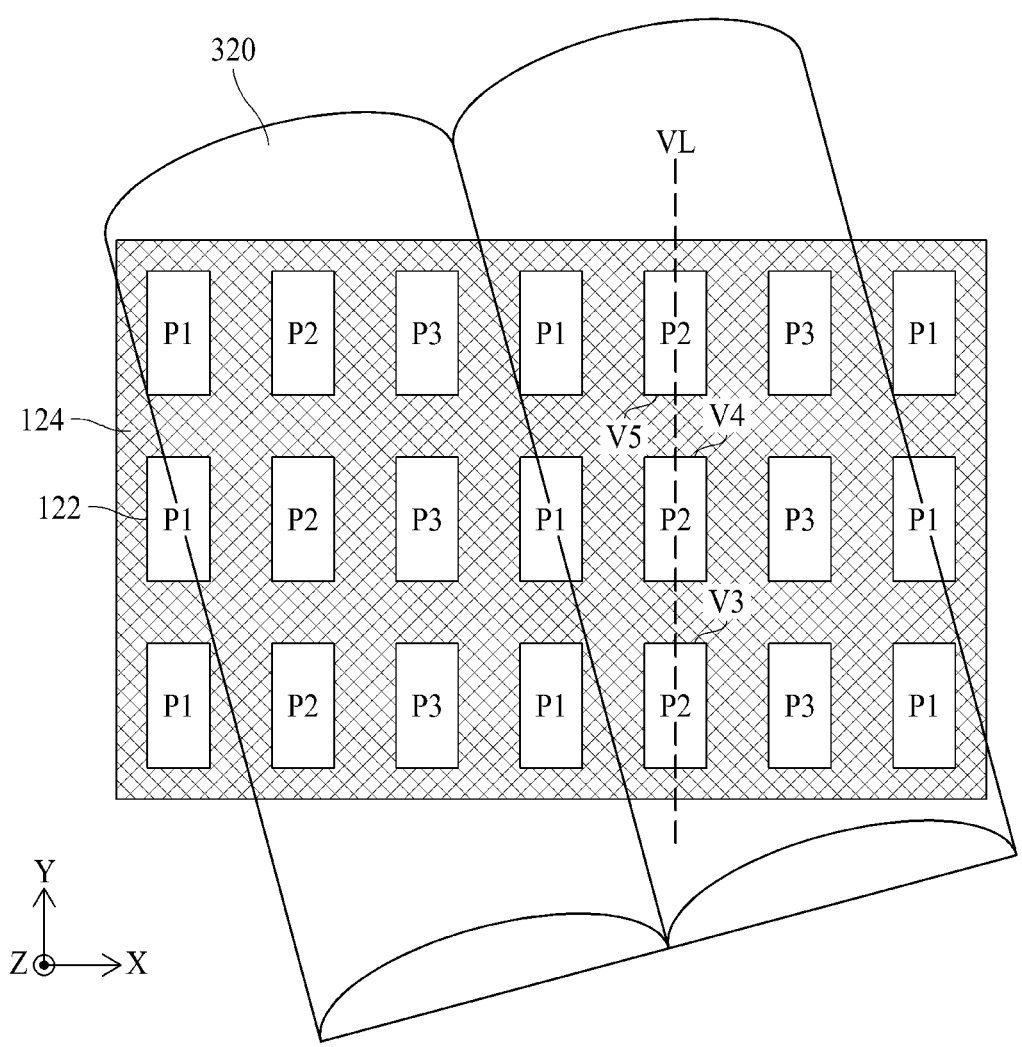
FIG. 6 illustrates an example in which a lens is angled and a viewer may perceive distortion.
Figure 7:
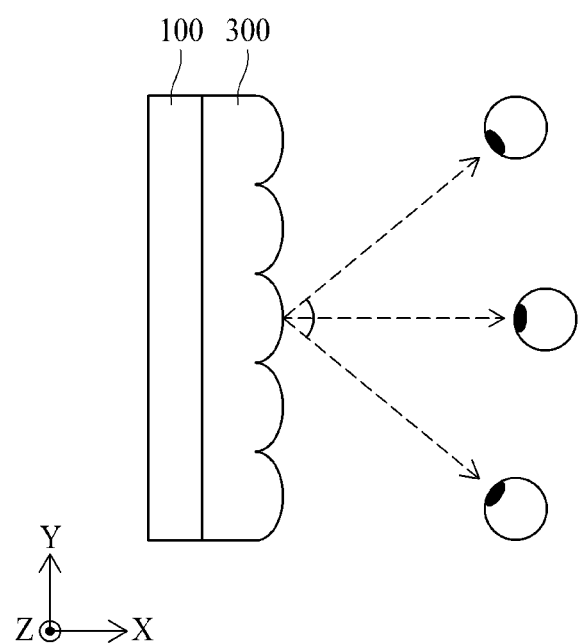
FIG. 7 describes a vertical image distortion.

FIG. 5 illustrates an example of pixels and lenses disposed in the stereopsis image display device according to one aspect of the present disclosure, FIG. 6 illustrates an example in which a lens is angled, and FIG. 7 describes a vertical image distortion.

Referring to FIG. 5, the stereopsis image display device 10 according to one aspect of the present disclosure includes the plurality of pixels P. The plurality of pixels P may include a first pixel P1 having a first color, a second pixel P2 having a second color, and a third pixel P3 having a third color. For example, the plurality of pixels P may include a first pixel P1 having a red color, a second pixel P2 having a green color, and a third pixel P3 having a blue color, but not limited thereto. The plurality of pixels P may further include a fourth pixel for displaying a white color.

The black matrix 124 may include the plurality of openings 122 between the plurality of pixels P, overlapping each of the plurality of pixels P, and configured to expose a portion of the overlapped pixel P. Each of the plurality of pixels P may be overlapped with the plurality of openings 122, to thereby define the opening area.

The plurality of openings 122 may have a rectangular shape, as shown in FIG. 5. The plurality of openings 122 may have the same shape. Each of the plurality of openings 122 have a first side and a second side. In some cases, the first sides may be long sides or vertical sides and may have the same length. The second sides may be short sides or horizontal sides and may have the same length. Each of the plurality of openings 122 may be provided with the first side and the second side perpendicular to each other. The plurality of openings 122 may be formed at a first intervals (e.g., a first pitch) in the horizontal direction and may be formed at a second interval (e.g., a second pitch) in the vertical direction.

The plurality of lenses 320 may be provided along the vertical direction. The plurality of lenses 320 may be arranged in parallel with one side of the opening 122, for example, the first side of the opening 122. A pitch width W1 in the plurality of lenses 320 may be determined based on the size of pixel and the number of views to be implemented in the stereopsis image display device 10.

The view map according to the multiple views may be assigned to the pixels P overlapped with the plurality of lenses 320, and the view image according to the assigned view map may be displayed.

The plurality of pixels P according to one aspect of the present disclosure includes K pixel groups (wherein, K is an integer equal to or greater than 2) composed of M pixels (wherein, M is an integer equal to or greater than 2) arranged in each of N horizontal lines H1, H2, H3, and H4 (wherein, N is an integer equal to or greater than 2). The number of horizontal lines H1, H2, H3, and H4 and the number of pixels P disposed in each of the horizontal lines H1, H2, H3, and H4 may vary according to the number of multi-views to be implemented in the stereopsis image display device 10.

As an example, as shown in FIG. 5, the plurality of pixels P may include the two pixel groups, that is, the first pixel group G1 and the second pixel group G2, wherein the second pixel group G2 is adjacently disposed in the vertical direction. The plurality of first pixel groups G1 may be arranged in the horizontal direction, and a plurality of second pixel groups G2 may be arranged in the horizontal direction.

Each of the first pixel group G1 and the second pixel group G2 may be composed of the three pixels P arranged in each of the four horizontal lines H1, H2, H3, and H4. In this case, each of the first pixel group G1 and the second pixel group G2 may include the total twelve pixels P.

In this case, the view map may be allocated to the pixels P included in one pixel group G1 and G2 based on the number of views. The view map may be set according to the number of pixels P included in one pixel group G1 to G2, that is, the twelve views. The pixels P included in one pixel group G1 to G2 may display the image of different views.

Specifically, the first pixel P of the first horizontal line H1 may correspond to the first view and may display the first view image in the first viewing area corresponding to the first view. The first pixel P of the second horizontal line H2 may correspond to the second view and may display the second view image in the second viewing area corresponding to the second view. The first pixel P of the third horizontal line H3 may correspond to the third view and may display the third view image in the third viewing area corresponding to the third view. The first pixel P of the fourth horizontal line H4 may correspond to the fourth view and may display the fourth view image in the fourth viewing area corresponding to the fourth view.

In the same manner as the first pixels P described above, the second pixels P of the respective first to fourth horizontal lines H1, H2, H3, and H4 may correspond to the fifth to eighth views, and the third pixels P of the respective first to fourth horizontal lines H1, H2, H3, and H4 may correspond to the ninth to twelfth views.

The plurality of pixels P, according to one aspect of the present disclosure, are characterized by an offset based on the horizontal line. For example, the pixels P disposed in each of the N horizontal lines are shifted in the horizontal direction by a first distance PSV.

In more detail, the N horizontal lines may include the first horizontal line H1, and the second horizontal line H2 adjacent to the first horizontal line H1 in the vertical direction. Herein, the M pixels P are disposed in the second horizontal line H2 may be shifted by the first distance PSV in the horizontal direction with respect to the pixels P disposed in the first horizontal line H1. That is, each horizontal line is offset based on a previous horizontal line within a group.

Even when the N horizontal lines are three or more, the pixels P disposed in each of the three or more horizontal lines may be sequentially shifted by the first distance PSV. The N horizontal lines may include the first to fourth horizontal lines H1, H2, H3, and H4 sequentially formed in the vertical direction. The M pixels P disposed in the second horizontal line H2 may be shifted by the first distance PSV in the horizontal direction with respect to the pixels P disposed in the first horizontal line H1, and the M pixels P disposed in the third horizontal line H3 may be shifted by the first distance PSV in the horizontal direction with respect to the pixels P disposed in the second horizontal line H2. In addition, the M pixels P disposed in the fourth horizontal line H4 may be shifted by the first distance PSV in the horizontal direction with respect to the pixels P disposed in the third horizontal line H3.

FIG. 5 shows that the four horizontal lines are included in one pixel group G1 to G2, but the disclosure is not limited thereto. For example, one pixel group G1 and G2 may include two or more horizontal lines or may include four or less than four horizontal lines, or more than four horizontal lines.

The first distance PSV may be determined based on the size of pixel P. For example, the first distance PSV may correspond to 1/N of a horizontal length PS of the pixel P. In this case, N corresponds to the number of horizontal lines H1, H2, H3, and H4 included in one pixel group G1 and G2. As shown in FIG. 5, when the four horizontal lines H1, H2, H3, and H4 are included in one pixel group G1, G2, the first distance PSV may correspond to ¼ of the horizontal length PS of the pixel P. In some cases, the horizontal length PS of the pixel P may include the opening area of the pixel P overlapping the opening 122 and a non-opening area covered by the black matrix 124. As an example, the horizontal length PS of the pixel P may correspond to the horizontal length of the center of another pixel P adjacent to the center of one pixel P.

In the stereopsis image display device 10 according to one aspect of the present disclosure, the pixels P included in the same pixel group G1 and G2 are shifted on each horizontal line to prevent vertical image distortion.

As shown in FIG. 6, the pixels P may be aligned along a straight line in the vertical direction, and the plurality of lenses 320 may be arranged while being oriented at a predetermined angle in a related art stereopsis image display device. When a viewer views a stereopsis image displayed by the related art stereopsis image display device and moves their focal region (e.g., a foveated region) in the vertical direction rather than the horizontal direction as shown in FIG. 7, the viewer sees different images according to the viewing position.

Both eyes of a viewer may move their focal region up and down on one vertical line VL while watching the image displayed by the pixels P shown in FIG. 6. At this time, the viewer may view images corresponding to different views V1, V2, and V3 while moving their focal region up and down on the vertical line VL. When the viewer is located on the front, the viewer may view the fourth view image through the pixel V4 corresponding to the fourth view. When the viewer is positioned above or below the front, the viewer may view the third view image through the pixel V3 corresponding to the third view or the fifth view image through the pixel V5 corresponding to the fifth view. That is, the related art stereopsis image display device may cause a problem in which the vertical image is distorted according as both eyes of viewer move in the vertical direction.

Unlike the related art stereopsis image display device illustrated in FIG. 6, in case of the stereopsis image display device 10 according to one aspect of the present disclosure, the pixels P may be shifted and arranged for each horizontal line, and the plurality of lenses 320 may be arranged in the vertical direction without being angled. When a viewer moves their focal point in the vertical direction rather than the horizontal direction as shown in FIG. 7 while watching the stereopsis image displayed in the stereopsis image display device according to one aspect of the present disclosure, the viewer may not view another image even if the viewing position is changed.

Both eyes of the viewer may move up and down on one vertical line VL while watching the image displayed by the pixels P shown in FIG. 5. In this case, the viewer may view only the view image corresponding to one view V3 while moving their focal region up and down on the vertical line VL. Accordingly, the stereopsis image display device 10 according to one aspect of the present disclosure may prevent the vertical image from being distorted when both eyes of the viewer move in the vertical direction.

On the other hand, the plurality of pixels P, according to an aspect of the present disclosure, are characterized in that pixels P disposed in each of K pixel groups are shifted by a second distance GSV in the horizontal direction.

The K pixel groups may include the first pixel group G1 and the second pixel group G2 vertically adjacent to the first pixel group G1. Each of the first and second pixel groups G1 and G2 may include the M pixels P disposed in each of the N horizontal lines H1, H2, H3, and H4, as described above.

The second pixel group G2 may be shifted in the horizontal direction by the second distance GSV with respect to the first pixel group G1. That is, the pixels P disposed in each of the horizontal lines H1, H2, H3, and H4 of the second pixel group G2 may be shifted by the second distance GSV in the horizontal direction with respect to the pixels P disposed in each of the horizontal lines H1, H2, H3, and H4 of the first pixel group G1.

In more detail, the pixels P disposed in the first horizontal line H1 of the second pixel group G2 may be shifted by the second distance GSV in the horizontal direction with respect to the pixels P disposed in the first horizontal line H1 of the first pixel group G1. Also, the pixels P disposed in the second horizontal line H2 of the second pixel group G2 may be shifted by the second distance GSV in the horizontal direction with respect to the pixels P disposed in the second horizontal line H2 of the first pixel group G1.

FIG. 5 shows an example of two pixel groups G1 and G2, but the groups are not limited thereto. In some aspects, there may be more than two groups.

Hereinafter, the pixel groups G1 and G2 are shifted by the second distance GSV with reference to FIGS. 5 and 8 to 10, and an effect resulting therefrom will be described in detail.

Figure 8:
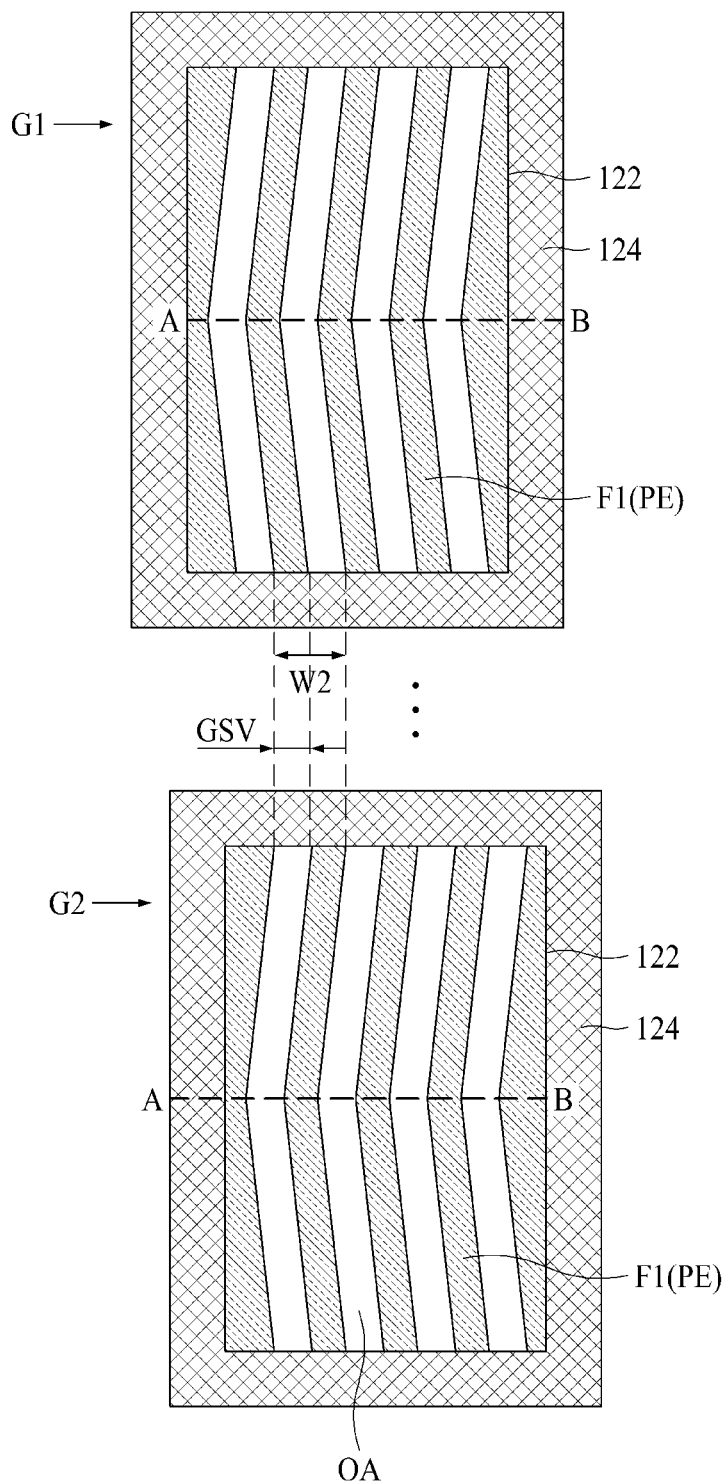
FIG. 8 describes a shift distance between pixel groups.
Figure 9:
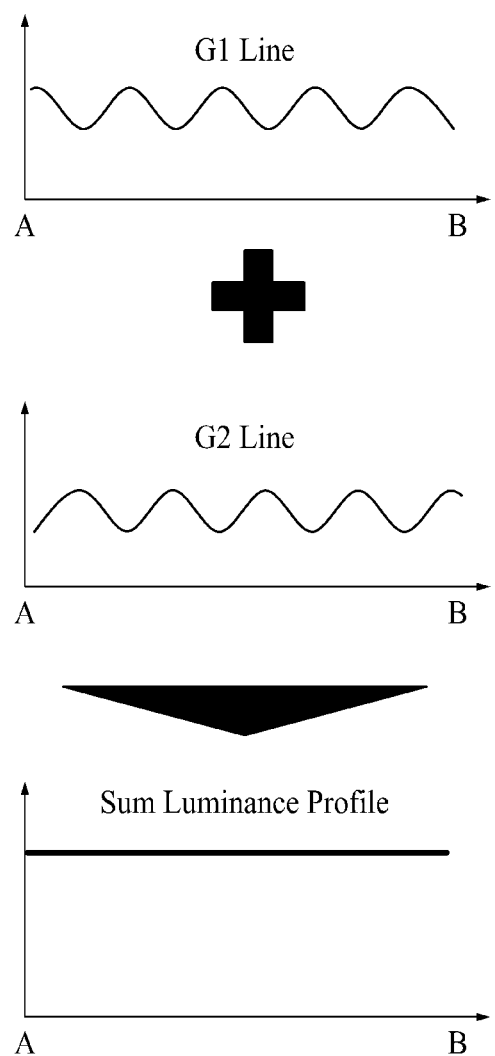
FIG. 9 describes an example of reducing a luminance deviation generated in the pixel.
Figure 10:
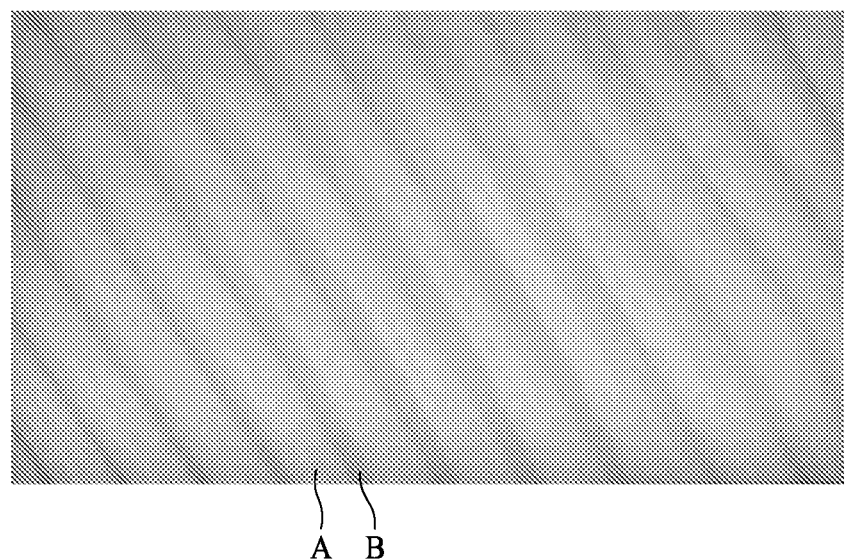
FIG. 10 describes an example in which a luminance deviation occurs in the pixel.

FIG. 8 describes a shift distance between the pixel groups, FIG. 9 describes an example of reducing a luminance deviation generated in the pixel, and FIG. 10 describes an example in which a luminance deviation occurs in the pixel.

Referring to FIGS. 5 and 8 to 10, the second distance GSV may be determined based on a pitch W2 of the first fingers F1 included in the pixel electrode PE of the pixel P. For example, the second distance GSV may correspond to 1/K of the pitch W2 of the first fingers F1. In this case, K may represent the number of pixel groups G1 and G2. Herein, the number of pixel groups G1 and G2 may refer to the number of pixel groups G1 and G2 classified based on an interval distance from the vertical line.

For example, in FIG. 5, the illustrated aspect includes two pixel groups G1 and G2 that are classified on the basis of the interval distance from the vertical line. In this case, because there are two groups, the second distance GSV may correspond to ½ of the pitch W2 of the first fingers F1, as shown in FIG. 8. That is, the second pixel group G2 may be shifted by half of the pitch W2 of the first fingers F1 in the horizontal direction with respect to the first pixel group G1.

When the K number of pixel groups G1 to G2 are three, the three pixel groups G1 and G2 may be sequentially arranged in the vertical direction and may be shifted by the second distance GSV. The second pixel group G2 may be shifted in the horizontal direction by the second distance GSV with respect to the first pixel group G1. Also, the third pixel group may be shifted by the second distance GSV in the horizontal direction with respect to the second pixel group G2. The three pixel groups G1 to G2 may be repeatedly arranged in the vertical direction.

On the other hand, in case of the stereopsis image display device 10 according to one aspect of the present disclosure, the K pixel groups G1 and G2 are shifted while being arranged, so that at least a portion of the first fingers F1 in each of the pixels P corresponding to the specific view included in each of the K pixel groups G1 and G2 may not overlap in the vertical direction. Specifically, at least a portion of the first fingers F1 provided in the $i^{th}$ pixel P of the first pixel group G1 may be not overlapped with the second fingers F1 provided in the $i^{th}$ pixel P of the second pixel group G2 in the vertical direction. That is, the first fingers F1 of the pixel electrode PE provided in the $i^{th}$ pixel P of the second pixel group G2 may at least partially overlap the opening area OA of the pixel electrode PE provided in the $i^{th}$ pixel P of the first pixel group G1. The opening area OA of the pixel electrode PE may be disposed between the first fingers F1 and may correspond to the space in which the first fingers F1 are spaced apart from each other.

In the stereopsis image display device 10 according to one aspect of the present disclosure, at least a portion of the first fingers F1 in each of the pixels P corresponding to the specific view included in each of the K pixel groups G1 and G2 may not overlap in the vertical direction so that it is possible to reduce a luminance deviation occurring inside the pixel P.

According to the arrangement of the pixel electrode PE and the common electrode CE, a relatively bright region and a relatively dark region may be generated in each of the pixels P. In this case, as shown in FIG. 10, the view image in which a bright luminance region A and a dark luminance region B are accumulated may be displayed in the view, whereby a luminance difference may be generated in the view. This difference in luminance may be enlarged by the lenses 320 and may be perceived by the viewer.

When the first fingers F1 of each of the pixels P corresponding to the same view completely overlap in the vertical direction, the view image accumulated in the vertical direction may be divided into the bright luminance region A and the dark luminance region B, and the difference between the regions A and B may increase.

In the stereopsis image display device 10 according to one aspect of the present disclosure, the K pixel groups G1 and G2 are arranged while being shifted so that it is possible to prevent the first fingers F1 of each of pixels P corresponding to the same view from completely overlapping in the vertical direction. In the stereopsis image display device 10 according to one aspect of the present disclosure, at least a portion of the first fingers F1 of each of the pixels P corresponding to the same view may not overlap in the vertical direction so that it is possible to reduce the luminance difference between the bright luminance region A and the dark luminance region B in the accumulated view image.

For example, as shown in FIG. 8, the second pixel group G2 may be shifted by half of the pitch W2 of the first fingers F1 in the horizontal direction with respect to the first pixel group G1. The first fingers F1 of the pixel electrode PE included in the pixel P corresponding to the specific view of the second pixel group G2 may overlap the opening area OA of the pixel electrode PE provided in the pixel P corresponding to the specific view of the first pixel group G1.

In this case, as shown in FIG. 9, the bright luminance region and the dark luminance region may repeatedly appear in the pixel P corresponding to the specific view of the first pixel group G1. The bright luminance region may correspond to the region in which the first fingers F1 are disposed, and the dark luminance region may correspond to the opening area OA between the first fingers F1.

In the meantime, as shown in FIG. 9, the bright luminance region and the dark luminance region may repeatedly appear in the pixel P corresponding to the specific view of the second pixel group G2. The bright luminance region may correspond to the region in which the first fingers F1 are disposed, and the dark luminance region may correspond to the opening area OA between the first fingers F1.

The second pixel group G2 is shifted by half of the pitch W2 of the first fingers F1 in the horizontal direction with respect to the first pixel group G1, whereby the bright luminance region in the pixel P corresponding to the specific view of the second pixel group G2 may overlap the dark luminance region in the pixel P corresponding to the specific view of the first pixel group G1. Also, the dark luminance region in the pixel P corresponding to the specific view of the second pixel group G2 may overlap the bright luminance region in the pixel P corresponding to the specific view of the first pixel group G1.

Accordingly, the accumulated luminance of the pixel P corresponding to the specific view of the first pixel group G1 and the pixel P corresponding to the specific view of the second pixel group G2 may have a reduced luminance deviation and a uniform value.

Referring once again to FIG. 5, the stereopsis image display device 10 according to one aspect of the present disclosure is characterized in that at least two of the $j^{th}$ pixels P in each of the N horizontal lines H1, H2, H3, and H4 have different colors.

Specifically, the N horizontal lines may include the first horizontal line H1, the second horizontal line H2 adjacent to the first horizontal line H1 in the vertical direction, and the third horizontal line H3 adjacent to the second horizontal line H2 in the vertical direction. The $j^{th}$ pixel P of the first horizontal line H1, the $j^{th}$ pixel P of the second horizontal line H2, and the $j^{th}$ pixel P of the third horizontal line H3 may have different colors. For example, the first pixel P1 of the first horizontal line H1 of the first pixel group G1 is the first pixel P1 having the first color, and the first pixel P3 of the second horizontal line H2 of the first pixel group G1 may be the third pixel P3 having the third color. The $j^{th}$ pixel of the third horizontal line H3 of the first pixel group G1 may be the second pixel P2 having the second color.

Figure 11:
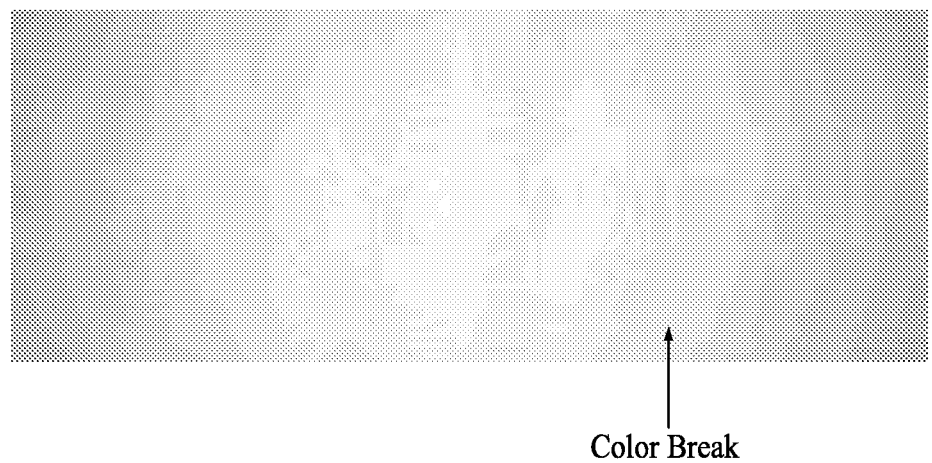
FIG. 11 illustrates an example in which a color break occurs.

Unlike the present disclosure, when the $j^{th}$ pixels P of the N horizontal lines have the same color, which results in a color break having a specific color occurs as illustrated in FIG. 11. For example, a red color in a certain region and may cause an increase in luminance deviation of the display area.

In the stereopsis image display device 10 according to one aspect of the present disclosure, the adjacent pixels among the $j^{th}$ pixels P of each of the N horizontal lines have different colors, and it may be possible to prevent an occurrence of color break and reduce the luminance deviation in the display area.

On the other hand, in case of the stereopsis image display device 10 according to one aspect of the present disclosure, the pixels P are arranged along the Z-shaped data line, whereby the pixels P arranged in the single view may be uniformly arranged. Hereinafter, the pixels P are uniformly arranged in the single view and an effect appearing of the arrangements will be described in detail with reference to FIGS. 5, 12, and 13.

Figure 12:
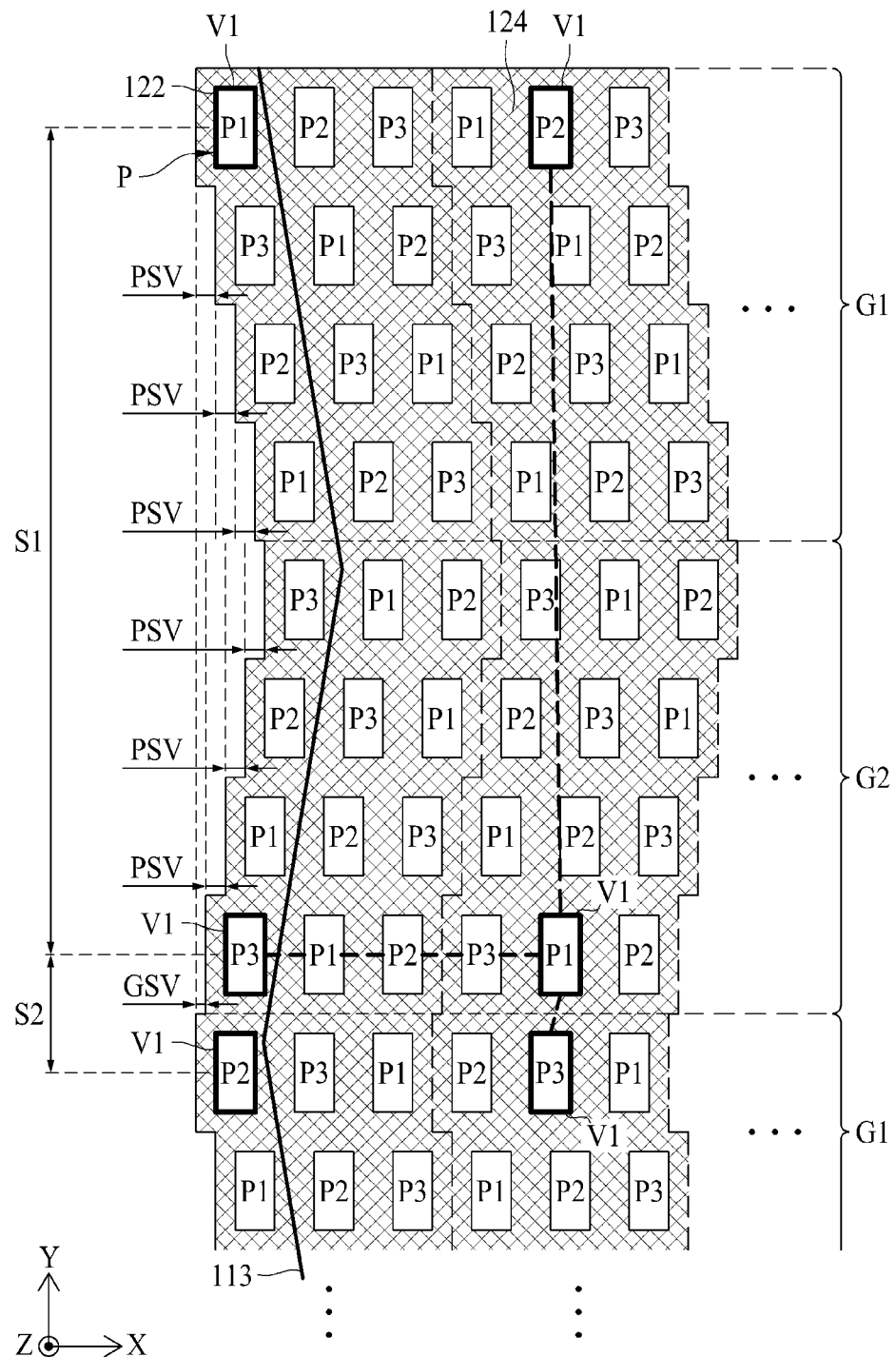
FIG. 12 illustrates an example in which the pixels are arranged along an S-shaped data line.
Figure 13:
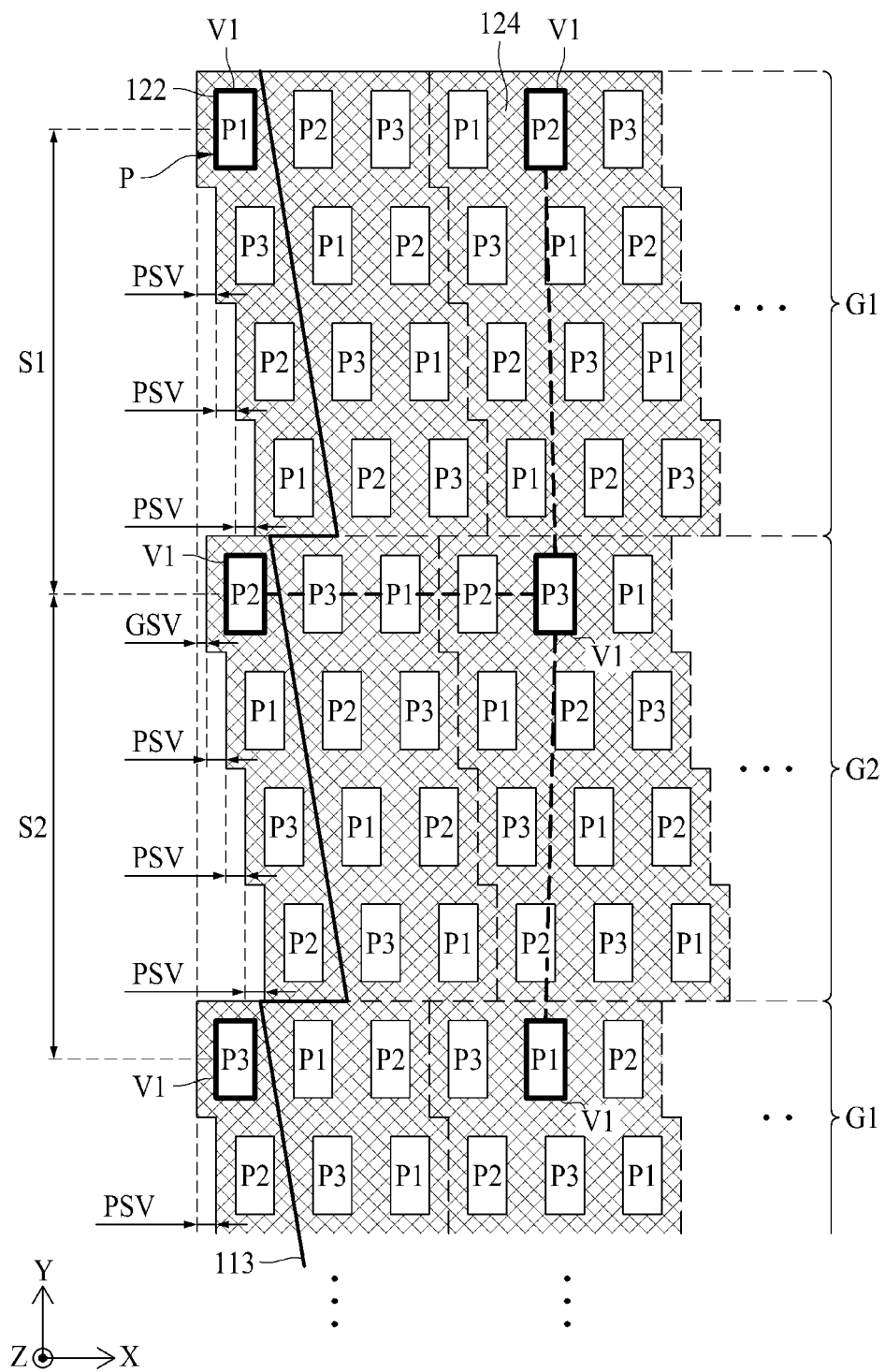
FIG. 13 illustrates an example in which the pixels are arranged along a Z-shaped data line.

FIG. 12 illustrates an example in which the pixels are arranged along the S-shaped data line, and FIG. 13 illustrates an example in which the pixels are arranged along the Z-shaped data line. In one aspect, an S-shaped data line corresponds to a symmetrical arrangement and a Z-shaped line corresponds to a repeating arrangement.

A stereopsis image display device shown in FIG. 12 includes a first pixel group G1 and a second pixel group G2, and the second pixel group G2 is shifted by a second distance GSV to complement the first pixel group G1. In addition, each of the first pixel group G1 and the second pixel group G2 includes a plurality of pixels P disposed in each of a plurality of horizontal lines, and the plurality of horizontal lines are shifted by a first distance PSV.

However, the stereopsis image display device shown in FIG. 12 is different from the stereopsis image display device 10 shown in FIGS. 5 and 13 in that the first pixel group G1 and the second pixel group G2 included in the stereopsis image display device of FIG. 12 have a symmetrical structure, and the last horizontal line of the second pixel group G2 is shifted by the second distance GSV with respect to the first horizontal line of the first pixel group G1.

The stereopsis image display device shown in FIG. 12 has a symmetrical structure between the first pixel group G1 and the second pixel group G2, so that the pixels P may be disposed along a S-shaped data line 113 in the vertical direction. As shown in FIG. 12, in case of the stereopsis image display device having the above-described structure, the pixels P arranged in the single view may be arranged non-uniformly. For example, the stereopsis image display device shown in FIG. 12 may include a first view pixel V1 for displaying an image for a first view in each of the first pixel group G1 and the second pixel group G2. The first view pixels V1 of each of the pixel groups G1 and G2 disposed adjacent to each other in the vertical direction may not have a constant vertical separation distance.

A first vertical separation distance S1 between the first view pixel V1 included in one first pixel group G1 and the first view pixel V1 included in the second pixel group G2 may have a value greater than a vertical length of one pixel group. The first vertical separation distance S1 may have a very large value close to twice the vertical length of one pixel group.

On the other hand, a second vertical separation distance S2 between the first view pixel V1 included in the second pixel group G2 and the first view pixel V1 included in another first pixel group G1 may have a value smaller than the vertical length of one pixel group. The second vertical separation distance S2 may have a very small value corresponding to a distance between the two adjacent horizontal lines.

That is, the stereopsis image display device shown in FIG. 12 has a large difference between the first vertical separation distance S1 and the second vertical separation distance S2. As a result, the first view pixels V1 may be non-uniformly arranged. When the pixels P arranged in the single view are non-uniformly arranged, a stereopsis image may be displayed with a low image quality.

Unlike the stereopsis image display device illustrated in FIG. 12, in case of the stereopsis image display device 10 according to one aspect of the present disclosure, the pixels P disposed in the single view may be uniformly arranged.

In the stereopsis image display device 10 according to one aspect of the present disclosure, as shown in FIG. 13, the first horizontal line of the second pixel group G2 may be shifted based on the second distance GSV with respect to the first horizontal line of the first pixel group G1.

In the stereopsis image display device 10 according to one aspect of the present disclosure, the pixels P may be arranged along a Z-shaped data line 113 in the vertical direction. In the stereopsis image display device 10 according to one aspect of the present disclosure, the pixels P arranged in the single view may be arranged uniformly. For example, the stereopsis image display device 10 according to one aspect of the present disclosure may include a first view pixel V1 for displaying an image for a first view in each of the first pixel group G1 and the second pixel group G2, as shown in FIG. 13. The first view pixels V1 of each of the pixel groups G1 and G2 disposed adjacent to each other may have a vertical separation distance.

A first vertical separation distance S1 (e.g., the distance between the first view pixel V1 included in one first pixel group G1 and the first view pixel V1 included in the second pixel group G2) may be the same as a second vertical separation distance S2 (e.g., the distance between the first view pixel V1 included in the second pixel group G2 and the first view pixel V1 included in another first pixel group G1).

That is, in case of the stereopsis image display device 10 according to an aspect of the present disclosure, the first vertical separation distance S1 and the second vertical separation distance S2 area is constant. As a result, the first view pixels V1 may be uniformly arranged. As described above, the stereopsis image display device 10 according to one aspect of the present disclosure may provide a stereopsis image of high quality by uniformly arranging the pixels P in the single view.

Figure 14:
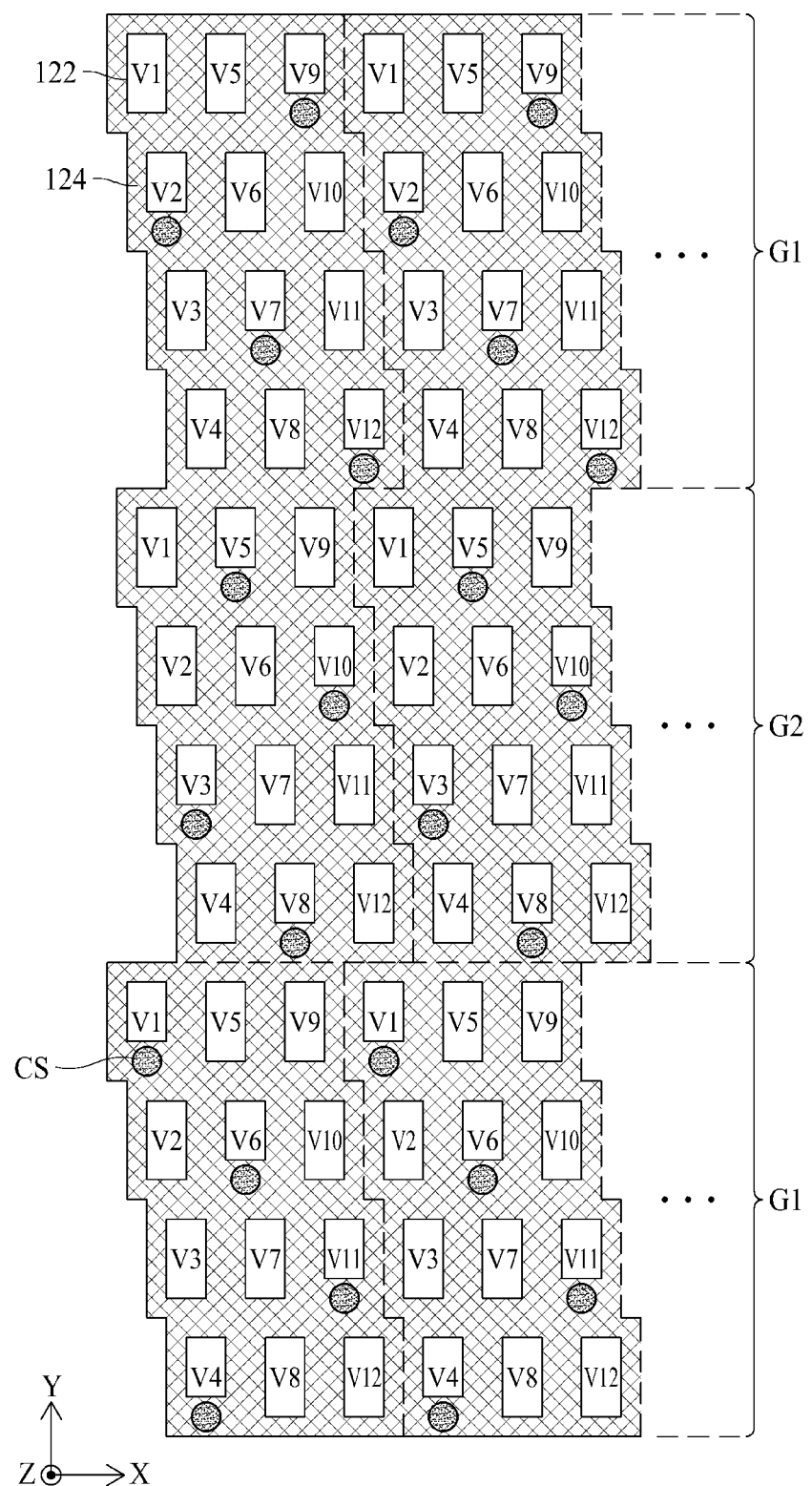
FIG. 14 illustrates an example of pixels and spacers disposed in a stereopsis image display device according to one aspect of the present disclosure.
Figure 15A:
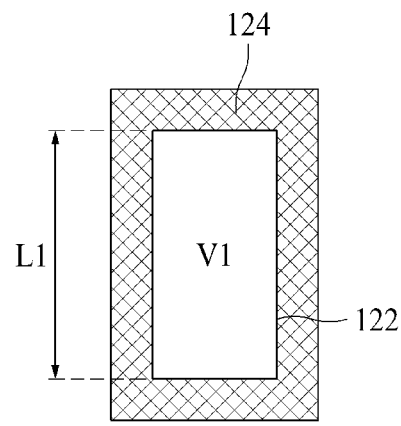
FIGS. 15A and 15B show the size of pixel based on whether the pixel includes a spacer.
Figure 15B:
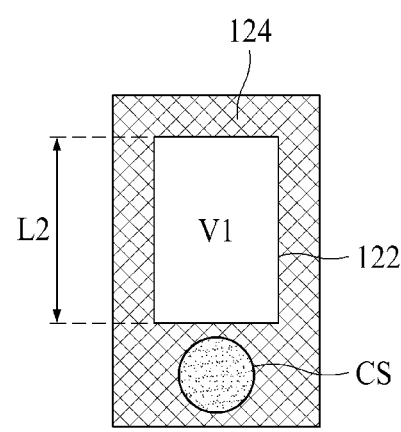
Figure 16:
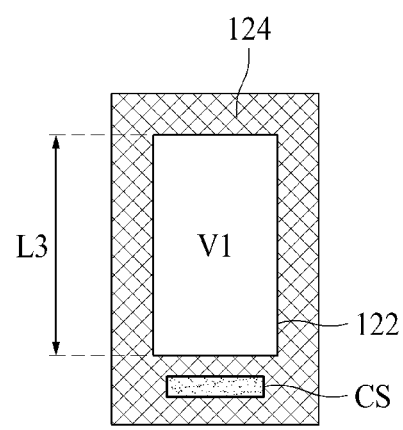
FIG. 16 illustrates another example of the shape of spacer.

FIG. 14 illustrates an example of pixels and spacers disposed in a stereopsis image display device according to one aspect of the present disclosure, FIG. 15A shows the size of pixel in which a spacer is not disposed, FIG. 15B shows a pixel in which a spacer is disposed, and FIG. 16 illustrates another example of the shape of spacer.

Referring to FIG. 14, a stereopsis image display device 10 according to one aspect of the present disclosure may further include a plurality of spacers CS. The plurality of spacers CS may be disposed between a first substrate and a second substrate and may be configured to maintain a cell gap of a liquid crystal layer.

The plurality of spacers CS may be disposed between each of a plurality of openings 122 and may overlap a black matrix 124. The plurality of spacers CS may have a shape having a width that is greater than a width between the neighboring openings 122. In this case, an opening area of the pixel P disposed adjacent to the spacer CS may be reduced by the spacer CS. When the opening area of the pixel P is formed along the shape of the circular spacer CS, a boundary portion between the opening area of the pixel P and a non-opening area may have an uneven shape. Accordingly, a boundary portion between the opening area of the pixel P and the non-opening area is blurred, and an overlapping portion between the views is increased due to the blurred portion and increases 3D crosstalk.

In the stereopsis image display device 10 according to one aspect of the present disclosure, even though the opening area of the pixel P disposed adjacent to the spacer CS is different in size from the opening area of the pixel P which is not disposed adjacent to the spacer CS, the opening area of the pixel P disposed adjacent to the spacer CS and the opening area of the pixel P which is not disposed adjacent to the spacer CS may be identically formed with the same shape.

As an example, an opening 122 overlapping the pixel P disposed adjacent to the spacer CS as shown in FIG. 15B may have a second vertical length L2 which is shorter than a first vertical length L1 of an opening 122 overlapping the pixel P which is not disposed adjacent to the spacer CS as shown in FIG. 15A. The opening 122 overlapping the pixel P disposed adjacent to the spacer CS may have the same rectangular shape as the opening 122 overlapping the pixel P which is not disposed adjacent to the spacer CS.

That is, the pixel P disposed adjacent to the spacer CS reduces the vertical length L2 of the opening 122, thereby reducing the size of the opening area and creating the space in which the spacer CS is disposed. In the stereopsis image display device 10 according to one aspect of the present disclosure, even if the circular spacer CS is included, the boundary portion between the opening area and the non-opening area of the pixel P is formed in a straight line, and the boundary portion may be clearly displayed without blurring and prevent generation of 3D crosstalk.

The stereopsis image display device 10 according to one aspect of the present disclosure may have the same number of spacers CS arranged for each view. Specifically, one pixel group G1 and G2 includes the plurality of pixels, and each of the plurality of pixels may correspond to one of the plurality of views. For example, one pixel group G1 and G2 includes twelve pixels, and each of the twelve pixels may correspond to one of twelve views. As shown in FIG. 14, the plurality of pixels may include the first view pixel V1 corresponding to the first view, the second view pixel V2 corresponding to the second view, the third view pixel V3 corresponding to the third view, the fourth view pixel V4 corresponding to the fourth view, the fifth view pixel V5 corresponding to the fifth view, the sixth view pixel V6 corresponding to the sixth view, the seventh view pixel V7 corresponding to the seventh view, the eighth view pixel V8 corresponding to the eighth view, the ninth view pixel V9 corresponding to the ninth view, the tenth view pixel V10 corresponding to the tenth view, the eleventh view pixel V11 corresponding to the eleventh view, and the twelfth view pixel V12 corresponding to the twelfth view.

The stereopsis image display device 10 according to one aspect of the present disclosure may have the same number of spacers CS arranged for each view. Among the plurality of view pixels corresponding to the single view, the number of view pixels arranged adjacent to the spacer CS may correspond to the number of spacers CS arranged in the single view.

For example, among the plurality of first view pixels V1 corresponding to one first view, the number of first view pixels V1 arranged adjacent to the spacer CS may correspond to the number of spacers CS disposed in the one first view. When the number of spacers CS arranged in one first view is 1, as shown in FIG. 14, the number of spacers CS arranged in each of the other single views may be 1.

The view pixel arranged adjacent the spacer CS may reduce the size of the opening area, whereby the luminance may be reduced in comparison to that of the view pixel arranged not to be adjacent to the spacer CS.

The stereopsis image display device 10 according to one aspect of the present disclosure may have the same number of view pixels in which the size of the opening area is reduced by the spacer CS for each view. That is, the stereopsis image display device 10 according to one aspect of the present disclosure may prevent the luminance deviation between the plurality of views due to the spacer CS by reducing the luminance to the same size in the plurality of views.

FIGS. 14 and 15 show that the spacer CS has the circular shape, but not limited thereto. In another aspect, as shown in FIG. 16, a plurality of spacers CS may have a bar shape that is elongated in a horizontal direction. Since the bar-shaped spacer CS has a short vertical length, it is possible to arrange the spaces CS without any reduction of an opening area in a pixel P. In this case, an opening 122 overlapping the pixel P disposed adjacent to the spacer CS may have a third vertical length L3 equal to a first vertical length L1 of an opening 122 overlapping the pixel P which is not disposed adjacent to the spacer CS.

According to the present disclosure, the pixels are shifted and arranged for each horizontal line, thereby preventing the vertical image from being distorted.

Also, according to the present disclosure, the pixel groups are shifted and arranged, thereby reducing the luminance deviation occurring in the pixel.

In addition, in the present disclosure, the pixels arranged adjacently in the vertical direction have different colors from each other, thereby preventing generation of the color break and reducing luminance deviation in the display area.

In addition, the present disclosure may provide the high quality stereopsis image by uniformly arranging the pixels arranged in the single view.

Also, in the present disclosure, the same number of spacers may be arranged for each view so that it is possible to prevent the luminance deviation between the plurality of views by the spacer.

It will be apparent to those skilled in the art that various substitutions, modifications, and variations are possible within the scope of the present disclosure without departing from the spirit and scope of the present disclosure. Therefore, the scope of the present disclosure is represented by the following claims, and all changes or modifications derived from the meaning, range and equivalent concept of the claims should be interpreted as being included in the scope of the present disclosure.

What is claimed is:

1. A stereopsis image display device comprising:
a display panel including a plurality of pixels and a black matrix having a plurality of openings respectively overlapped with the plurality of pixels; and
a plurality of lenses disposed over the display panel and extending in a vertical direction,
wherein the plurality of pixels includes K pixel groups composed of M pixels disposed in each of N horizontal lines, wherein K, M, and N are integers greater than or equal to 2,
the N horizontal lines include a first horizontal line and a second horizontal line adjacent to the first horizontal line in the vertical direction,
pixels arranged in the second horizontal line are shifted by a first distance in a horizontal direction with respect to the pixels arranged in the first horizontal line,
the K pixel groups include a first pixel group and a second pixel group disposed adjacent to the first pixel group in the vertical direction,
an initial pixel of each row in the second pixel group is shifted by a second distance in the horizontal direction with respect to the first pixel group,
the first distance is greater than the second distance, and
each of the plurality of pixels in the second pixel group is shifted by the second distance.

2. The stereopsis image display device of claim 1, wherein the first distance corresponds to 1/N of a horizontal length of the pixel.

3. The stereopsis image display device of claim 1,
wherein the plurality of lenses divide an image displayed on the plurality of pixels into a plurality of views, and
the pixels included in the same pixel group display images for the different views.

4. The stereopsis image display device of claim 1,
wherein each of the plurality of pixels includes a pixel electrode including fingers and an opening area disposed between the fingers, and
the fingers of the pixel electrode provided in $i^{th}$ pixel of the second pixel group partially overlap with the opening area of the pixel electrode provided in the $i^{th}$ pixel of the first pixel group.

5. The stereopsis image display device of claim 1,
wherein each of the plurality of pixels includes a pixel electrode including fingers, and the second distance is determined based on a pitch of the fingers.

6. The stereopsis image display device of claim 4, wherein the second distance corresponds to 1/K of the pitch of the fingers.

7. The stereopsis image display device of claim 1, wherein the K pixel groups are sequentially disposed in the vertical direction and are provided with different separation distances from a vertical line.

8. The stereopsis image display device of claim 1, wherein the K pixel groups are repeatedly arranged in the vertical direction.

9. The stereopsis image display device of claim 1, wherein $j^{th}$ pixel of the first horizontal line and the $j^{th}$ pixel of the second horizontal line have different colors from each other, wherein j is less than M+1.

10. The stereopsis image display device of claim 1, wherein the plurality of pixels are disposed along a repeating data line in the vertical direction.

11. The stereopsis image display device of claim 1,
wherein each of the K pixel groups includes a first view pixel for displaying an image of a first view, and
the first view pixel of an adjacent pixel group have a constant vertical separation distance.

12. The stereopsis image display device of claim 1, wherein each of the plurality of openings has a rectangular shape, and
the plurality of lenses are arranged in parallel with one side of each of the plurality of the openings.

13. The stereopsis image display device of claim 1, wherein the display panel includes:
a first substrate and a second substrate;
a liquid crystal layer disposed between the first substrate and the second substrate; and
a plurality of spacers maintaining a cell gap of the liquid crystal layer,
wherein the same-numbered spacers are arranged for each view.

14. The stereopsis image display device of claim 13, wherein each spacer of the plurality of spacers has a rectangular shape.

15. The stereopsis image display device of claim 13, wherein the plurality of openings comprise first openings and second openings,
- the first openings overlap each of the pixels disposed adjacent to the plurality of spacers, and
- the second openings which are not adjacent to the plurality of spacers and have a shorter vertical length in comparison to the first openings.

16. A stereopsis image display device comprising:
- a display panel including a plurality of pixel groups and a black matrix having a plurality of openings configured to overlap and expose pixels of the plurality of pixel groups; and
- a plurality of lenses disposed over the display panel and extending in a first direction,
- wherein each pixel group includes pixels disposed on a horizontal line, and
- wherein each horizontal line in a pixel group is horizontally offset at least based on a position of the horizontal lines with respect to a first horizontal line of the pixel group,
- the pixel groups include a first pixel group and a second pixel group disposed adjacent to the first pixel group in the vertical direction and an initial pixel of each row in the second pixel group is shifted by a second distance in the horizontal direction with respect to the first pixel group,
- the first distance is greater than the second distance, and
- each of the plurality of pixels in the second pixel group is shifted by the second distance.

17. The stereopsis image display device of claim 16, wherein the second distance is based on based on a pitch of fingers included in a pixel electrode of a pixel P.

* * * * *